United States Patent
Saito et al.

(10) Patent No.: US 8,826,309 B2
(45) Date of Patent: Sep. 2, 2014

(54) OPTICAL PICKUP AND OPTICAL DISC DEVICE

(71) Applicant: Sony Corporation, Tokyo (JP)

(72) Inventors: Kimihiro Saito, Kanagawa (JP); Takashi Nakao, Tokyo (JP); Yutaka Tentaku, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/966,503

(22) Filed: Aug. 14, 2013

(65) Prior Publication Data

US 2014/0068642 A1 Mar. 6, 2014

(30) Foreign Application Priority Data

Aug. 29, 2012 (JP) ................................. 2012-188348

(51) Int. Cl.
*G11B 7/1381* (2012.01)

(52) U.S. Cl.
CPC .................................. *G11B 7/1381* (2013.01)
USPC ....................................................... 720/695

(58) Field of Classification Search
USPC ....................................................... 720/695
See application file for complete search history.

(56) References Cited

U.S. PATENT DOCUMENTS

| 6,381,203 B1* | 4/2002 | Muramatsu ................ 369/47.17 |
| 2005/0036432 A1* | 2/2005 | Kim et al. ................ 369/112.16 |
| 2012/0151508 A1* | 6/2012 | Komma et al. ................ 720/695 |

OTHER PUBLICATIONS

Sano, K. et al., "Novel One-beam Tracking Detection Method for Dual-Layer Blu-ray Discs", ICICE Technical Report, CPM 2005-149, pp. 31-34.

* cited by examiner

*Primary Examiner* — Allen T Cao
(74) *Attorney, Agent, or Firm* — Sony Corporation

(57) ABSTRACT

There is provided an optical pickup including a light source, an objective lens configured to focus light from the light source onto one signal face of an optical disc, the optical disc including two or more signal faces, each of the signal faces having a groove formed therein, a photodetector configured to receive returning rays from the optical disc, the photodetector having a light receiving face divided into four light receiving regions by a dividing line that is substantially parallel to a track direction of the optical disc and by a dividing line that is substantially perpendicular to the track direction, and a shading unit disposed at an incident side of the photodetector and configured to block, of returning rays from a signal face other than the one signal face of the optical disc, at least a diffracted ray that is diffracted by the groove.

10 Claims, 16 Drawing Sheets

$a_{max} = 2d \cdot \tan(\sin^{-1}(NA/N))$

KK (Tp=0.32) (KK=b/a$_{max}$)

Nsin θ

FIG. 12
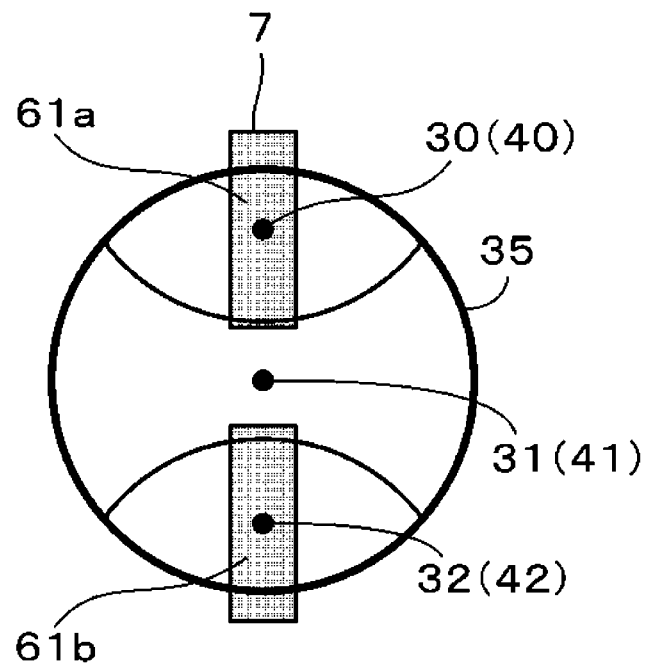
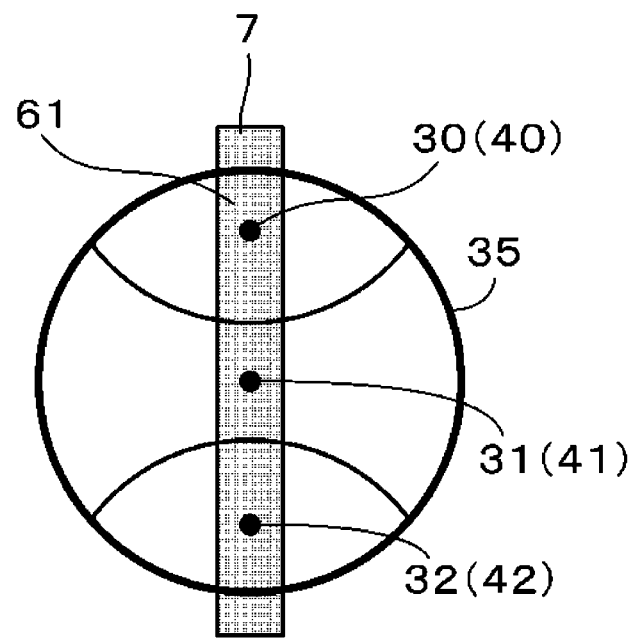

ns with a spiral track such as a Blu-ray Disc (BD)™ is known. In such an optical disc device, a track in an optical disc is irradiated with a light beam when recording or playing back data. At that time, the optical disc device generates a tracking error signal that indicates an amount of deviation from the center of the track to be irradiated with the light beam, based on reflected light from the optical disc. Then, the optical disc device carries out tracking control based on the tracking error signal so that the light beam constantly stays on the track.

A differential push pull (DPP) method is known as a tracking control method. In the DPP method, a laser beam from a laser light source is split into a main beam and two sub-beams using a grating. Then, a tracking error is detected from a sub-beam push pull (SPP) signal, and a DC offset that occurs in a main beam push pull (MPP) signal is canceled.

There is a growing demand for increased capacity of an optical disc. Multilayering in which a plurality of signal faces is stacked on one another is one of the methods for increasing the capacity of an optical disc. When recording data onto or playing back data on such a multilayer optical disc, a light beam is focused on a desired signal face.

However, since a light beam passes through signal faces other than a signal face that is most distanced from the surface of the multilayer optical disc on which the light beam is incident, the light beam is reflected by the signal faces of layers (hereinafter, referred to as other layers) other than a desired layer on which recording or playback is carried out (hereinafter, referred to as a recording/playback layer). Reflected light from the signal faces of the other layers (referred to as other layer stray light) is incident on a photodetector as crosstalk light. Then, noise is generated as the other layer stray light is superimposed onto the reflected light from the signal face of the recording/playback layer (hereinafter, referred to as signal light).

The influence of the other layer stray light is greater in a BD than in a multilayer digital versatile disc (DVD). That is because the numerical aperture (NA) of an objective lens is larger for a BD, and thus the spot size of the crosstalk light is larger. In the case of the DPP method, an SPP with less power is affected more by the crosstalk light. Accordingly, a push pull method of a single beam system is used. In the push pull method, light receiving signals are detected by a photodetector having a light receiving face that is divided into two regions along a track direction (tangential direction), and a tracking error is detected from a difference in the light receiving signals in the respective regions.

In the push pull method, a push pull signal is formed based on diffracted rays that are diffracted by grooves of different depths. If the groove depth is as small as $\lambda/12$, a tracking error signal to be obtained through calculation has small amplitude. Thus, there has been a problem in that an offset occurs in a tracking error signal around a boundary between a recorded area and an unrecorded area. In order to solve such a problem, a method called an advanced push pull (APP) is being proposed for detecting a tracking error signal. In addition, an improved APP method that can be applied to a dual layer disc is being proposed (see, for example, Kousei Sano et al., "Novel One-Beam Tracking Detection Method for Dual-Layer Blu-ray Discs," IEICE Technical Report, CPM, Oct. 14, 2005, vol. 105, No. 360, pp. 31-34).

SUMMARY

In a write once type or rewritable type optical disc, address information that indicates a position on the optical disc may be desirably recorded in advance for recording information. As a method for recording such address information, a method in which a signal for forming a spiral groove is modulated by the address information is known. Here, a track formed of a groove is referred to as a groove track. A groove is defined as a portion that is irradiated with a laser beam when manufacturing an optical disc.

In this way, with an optical disc having a groove, the optical disc may function as a reflective diffraction grating. Thus, a light beam that is focused on a signal face is diffracted by the signal face, and a 0th order ray (reflected ray) and ±1st order rays (diffracted rays) are generated in directions that cross the track direction (i.e., directions substantially perpendicular to the track direction). Then, the 0th order ray and the ±1st order rays travel back to the objective lens. In a tracking error signal forming method as proposed in Kousei Sano et al., "Novel One-Beam Tracking Detection Method for Dual-Layer Blu-ray Discs," IEICE Technical Report, CPM, Oct. 14, 2005, vol. 105, No. 360, pp. 31-34, diffraction by a groove is not taken into consideration, and thus there has been a problem in that a false tracking error signal is generated by a groove in another layer.

Accordingly, according to an embodiment of the present disclosure, there is provided an optical pickup and an optical disc device that are capable of improving tracking stability in a multilayer optical disc in which grooves are formed.

According to an embodiment of the present disclosure, there is provided an optical pickup including a light source, an objective lens configured to focus light from the light source onto one signal face of an optical disc, the optical disc including two or more signal faces, each of the signal faces having a groove formed therein, a photodetector configured to receive returning rays from the optical disc, the photodetector having a light receiving face divided into four light receiving regions by a dividing line that is substantially parallel to a track direction of the optical disc and by a dividing line that is substantially perpendicular to the track direction, and a shading unit disposed at an incident side of the photodetector and configured to block, of returning rays from a signal face other than the one signal face of the optical disc, at least a diffracted ray that is diffracted by the groove.

According to an embodiment of the present disclosure, there is provided an optical disc device including a rotation driving unit configured to rotate-drive an optical disc, a light source, an objective lens configured to focus light from the light source onto a multilayer optical disc, the multilayer optical disc including two or more signal faces, each of the signal faces having a groove formed therein, an actuator configured to displace the objective lens in a direction substantially perpendicular to a track direction of the optical disc, a photodetector configured to receive returning rays from the optical disc, the photodetector having a light receiving face divided into four light receiving regions by a dividing line that is substantially parallel to a track direction of the optical disc and by a dividing line that is substantially perpendicular to the track direction, a shading unit disposed at an incident side of the photodetector and configured to block, of returning rays from a signal face other than the one signal face of the optical disc, at least a diffracted ray that is diffracted by the groove, and a calculation unit configured to generate a tracking error signal by calculating a detection signal of the photodetector. The actuator is driven with the tracking error signal.

According to an embodiment of the present disclosure, an optical pickup and an optical disc device with improved tracking stability in a multilayer optical disc can be provided.

BRIEF DESCRIPTION OF THE DRAWINGS

FIGS. 12A and 12B are schematic diagrams illustrating examples of a mask in the first embodiment of the present disclosure;

DETAILED DESCRIPTION OF THE EMBODIMENTS

Figure 1:
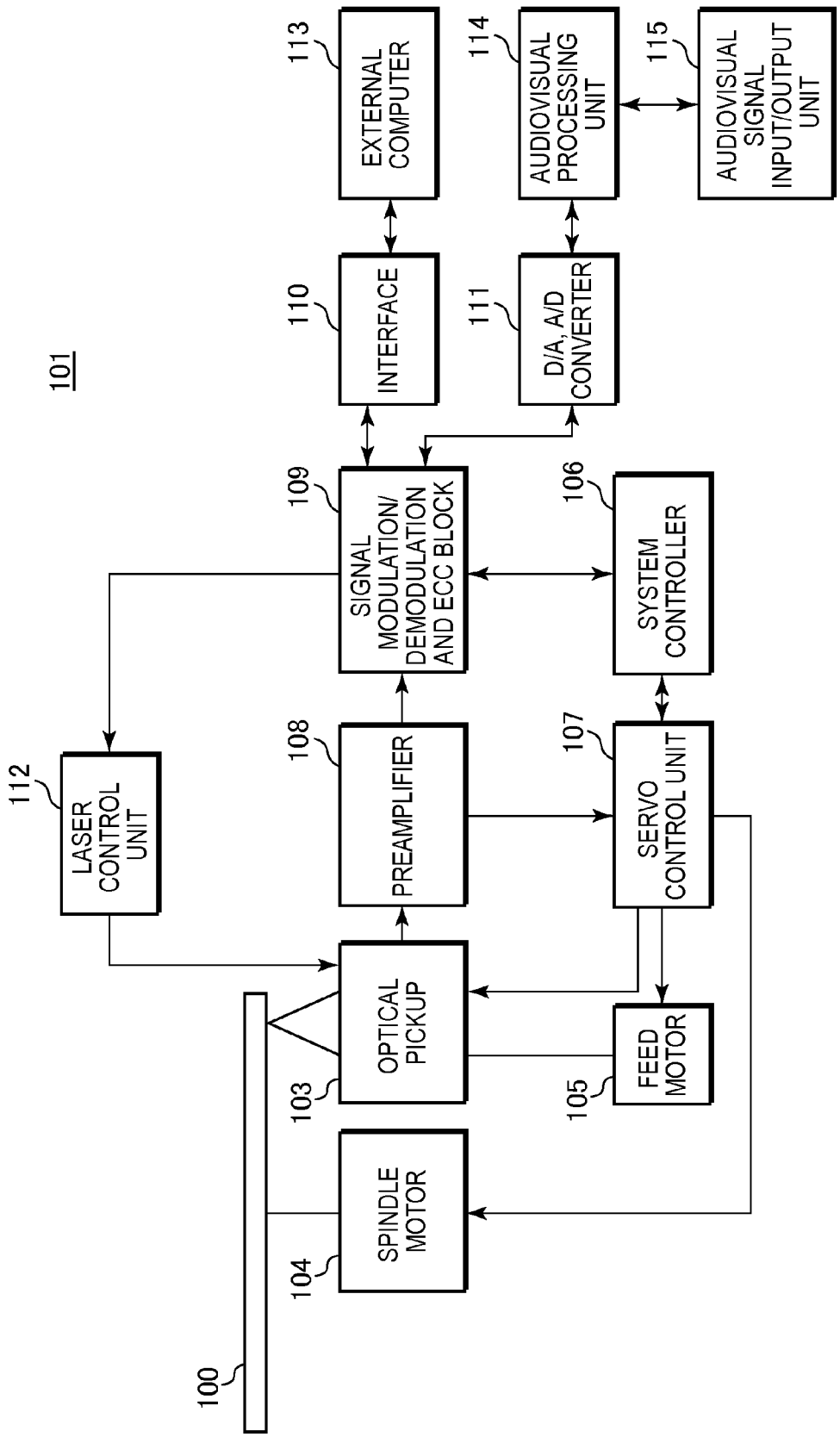
FIG. 1 is a block diagram illustrating a configuration of an optical disc device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments described hereinafter are preferred specific examples of the present disclosure and include various limitations that are technically preferable. However, the scope of the present disclosure is not limited to the embodiments described hereinafter unless such limitations are indicated.

The embodiments of the present disclosure will be described in the following order.
<1. First Embodiment of Present Disclosure>
<2. Second Embodiment of Present Disclosure>
<3. Modification>

1. First Embodiment of Present Disclosure

Configuration of Optical Disc Device and Optical Disc

As illustrated in FIG. 1, an optical disc device 101 to which a first embodiment of the present disclosure is applied includes an optical pickup 103 and a spindle motor 104. The optical pickup 103 records information onto and plays back information on an optical disc 100 that serves as an optical recording medium, and the spindle motor 104 rotates the optical disc 100. A feed motor 105 is further provided to move the optical pickup 103 in a radial direction of the optical disc 100.

Figure 2:
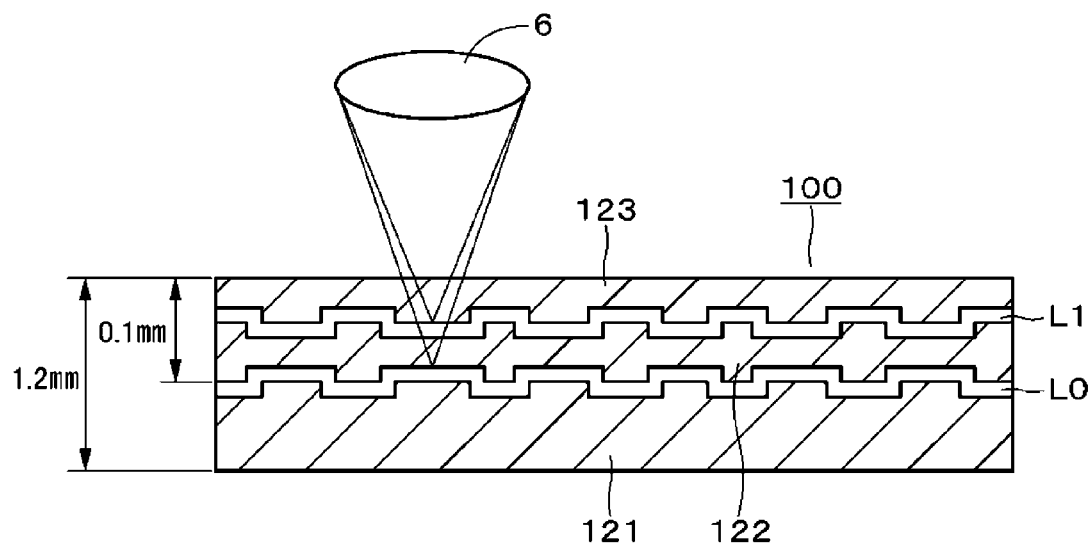
FIG. 2 is a schematic diagram illustrating an example of an optical disc to which an embodiment of the present disclosure can be applied.

With reference to FIG. 2, an example of the optical disc 100 will be described. The optical disc 100 is substantially disc-shaped with a center hole (not illustrated) being opened at the center thereof. The optical disc 100, for example, has a disc diameter of 120 mm, a center hole diameter of 15 mm, and a disc thickness of 1.2 mm. The optical disc 100 has a multi-layer structure in which an L0 layer, an intermediate layer 122, an L1 layer, and a cover layer 123 are sequentially stacked on a substrate 121. The substrate 121 is formed, for example, of a low-absorbent resin such as polycarbonate (PC) and a cyclo olefin polymer.

Each of the L0 layer and the L1 layer, which are information recording layers (signal faces), is a reflective film, a recording film, or the like deposited on concavities and convexities of the substrate 121. In a read-only optical disc, the L0 layer and the L1 layer are reflective films formed, for example, of gold (Au), silver (Ag), a silver alloy, aluminum (Al), an aluminum alloy, or the like. In a write once type optical disc, each of the L0 layer and the L1 layer is constituted, for example, by sequentially stacking a reflective film and a recording layer formed of an organic coloring material. In a rewritable type optical disc, each of the L0 layer and the L1 layer is constituted, for example, by sequentially stacking a reflective film, a lower dielectric layer, a phase change recording layer, and an upper dielectric layer. Note that in the first embodiment of the present disclosure, a spiral groove is formed in each of the L0 layer and the L1 layer. An address that indicates a position on the optical disc 100 is recorded in advance as, for example, the groove is wobbled.

The intermediate layer 122 is formed on the L0 layer that is formed on the substrate 121. The L1 layer is formed on the intermediate layer 122. The cover layer 123 is formed on the L1 layer that is formed on the intermediate layer 122. The cover layer 123 is formed to protect the optical disc. In recording and playback of an information signal, a laser beam is, for example, focused by an objective lens 6 onto an information recording layer through the cover layer 123.

A UV resin can be used to form the intermediate layer 122 and the cover layer 123. A lubricant layer (not illustrated) such as a hard coat may, for example, be formed on the surface of the cover layer 123, if appropriate. The lubricant layer serves to protect and smooth the surface of the cover layer 123. The intermediate layer 122 may, for example, have a thickness of 25 μm, and the cover layer 123 may, for example, have a thickness of 75 μm. Each of the intermediate layer 122 and the cover layer 123 may preferably have a uniform thickness.

An information recording layer (L0 layer or L1 layer) is irradiated with a laser beam through the cover layer 123 of the optical disc 100, and thus an information signal is recorded or played back. For example, a laser beam at a wavelength of 400 nm to 410 nm is focused onto the L0 layer or the L1 layer by the objective lens 6 having a numerical aperture of 0.84 to 0.86 through the cover layer 123, and thus the information signal is recorded or played back. Note that other multilayer optical discs such as a multilayer DVD suited for a semiconductor laser having an emission wavelength of approximately 655 nm may also be adopted as the optical disc 100.

Referring back to FIG. 1, in the optical disc device 101, a servo control unit 107 that is controlled based on an instruction from a system controller 106 controls driving of the spindle motor 104 and the feed motor 105.

The optical pickup 103 irradiates a recording face of the optical disc 100 with a light beam and detects a reflected light beam from the recording face of the light beam. The optical pickup 103 supplies, to a preamplifier 108, signals that correspond to respective rays within the reflected light beam from the recording face of the optical disc 100.

The preamplifier 108 generates a focus error signal through an astigmatic method or the like based on an output from a photodetector and also generates a tracking error signal, which will be described later. In addition, the preamplifier 108 generates an RF signal and outputs the RF signal to a signal modulation/demodulation and ECC block 109. The preamplifier 108 outputs the focus error signal and the tracking error signal to the servo control unit 107.

When data is to be recorded onto the optical disc 100, the signal modulation/demodulation and ECC block 109 carries out recording processing on a digital signal that is inputted from an interface 110 or a D/A A/D converter 111. For example, the signal modulation/demodulation and ECC block 109 carries out error correction coding to carry out modulation processing of a 1-7 PP system or the like.

Note that when compressed data is to be recorded, a compression expansion unit may be provided between the signal modulation/demodulation and ECC block 109 and the interface 110 or between the signal modulation/demodulation and ECC block 109 and the D/A A/D converter 111. In this case, the data is compressed into the MPEG 2 (Moving Picture Experts Group Phase 2) format, the MPEG 4 format, or the like.

The servo control unit 107 receives a focus error signal and a tracking error signal from the preamplifier 108. The servo control unit 107 generates a focus servo signal and a tracking servo signal so that the focus error signal and the tracking error signal become 0 and, based on these servo signals, controls driving of an objective lens driving unit such as a two-axis actuator for driving the objective lens. In addition, the servo control unit 107 detects a synchronization signal or the like from an output of the preamplifier 108 and controls the spindle motor 104 through a constant linear velocity (CLU) method or the like. A laser control unit 112 controls a laser light source of the optical pickup 103. The laser control unit 112 controls the laser light source so that output powers thereof differ, respectively, in a recording mode and in a playback mode.

The system controller 106 controls the entire optical disc device. The system controller 106 controls the optical disc device 101 in accordance with an operation input from a user and based on address information or a table of contents (TOC) recorded in an innermost circumferential pre-mastered pit or groove of the optical disc. Here, the system controller 106 specifies a recording position or a playback position on the optical disc to be recorded onto or played back and controls each unit based on the specified position.

The optical disc device 101 configured as described above rotates the optical disc 100 with the spindle motor 104 and controls driving of the feed motor 105 in accordance with a control signal from the servo control unit 107. The optical disc device 101 moves the optical pickup 103 to a position that corresponds to a desired recording track of the optical disc 100 to record information onto or plays back information on the optical disc 100.

To be more specific, in recording or playback with the optical disc device 101, the servo control unit 107 rotates the optical disc 100, and the optical pickup 103 irradiates the optical disc 100 with a light beam from the light source. Then, the optical pickup 103 detects a returning light beam from the optical disc 100 with a photodetector and generates a focus error signal or a tracking error signal. Based on the focus error signal or the tracking error signal, the optical pickup 103 drives the objective lens with an objective lens driving mechanism to carry out a focus servo or a tracking servo.

In addition, when recording with the optical disc device 101, a signal from an external computer 113 is inputted to the signal modulation/demodulation and ECC block 109 through the interface 110. The signal modulation/demodulation and ECC block 109 carries out error correction coding on digital data that is inputted from the interface 110 or the D/A A/D converter 111 and then generates a recording signal after subjecting the digital data to modulation processing. The laser control unit 112 controls the laser light source of the optical pickup 103 based on the recording signal that is generated by the signal modulation/demodulation and ECC block 109 to record data onto the optical disc 100.

When playing back information recorded on the optical disc 100 with the optical disc device 101, the signal modulation/demodulation and ECC block 109 carries out demodulation processing on a signal detected by the photodetector. If the recording signal that has been demodulated by the signal modulation/demodulation and ECC block 109 is for data storage in a computer, the demodulated recording signal is outputted to the external computer 113 through the interface 110. Through this, the external computer 113 can operate in accordance with the signal recorded on the optical disc 100.

If the recording signal that has been demodulated by the signal modulation/demodulation and ECC block 109 is for audiovisual use, the demodulated recording signal is subjected to digital-to-analog conversion in the D/A A/D converter 111 and supplied to an audiovisual processing unit 114.

Then, the audiovisual processing unit 114 carries out audiovisual processing on the recording signal and outputs the recording signal to an external speaker or monitor (not illustrated) through an audiovisual signal input/output unit 115.

"Optical Pickup"

Figure 3:
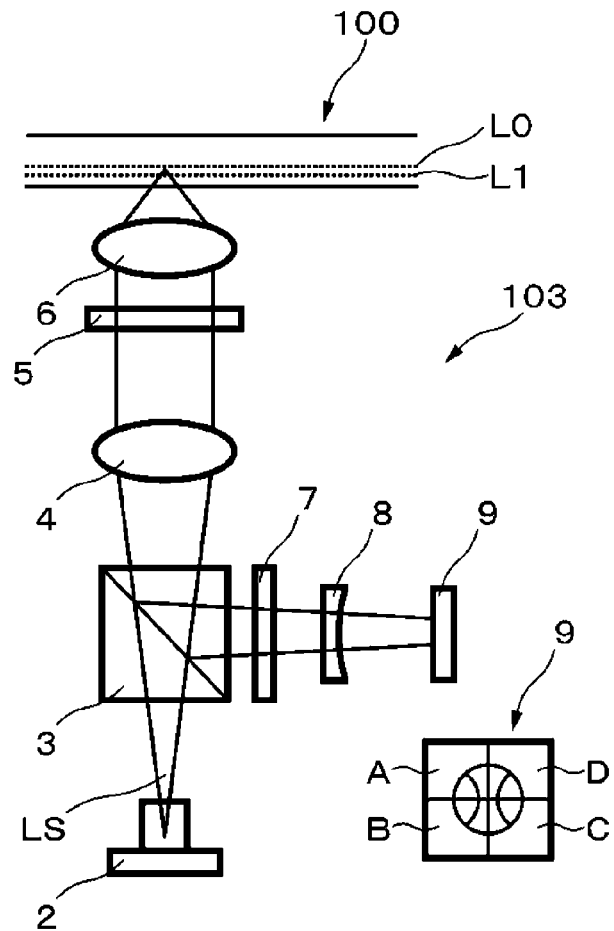
FIG. 3 is a schematic diagram illustrating a configuration of an optical pickup in the first embodiment of the present disclosure.

Subsequently, the optical pickup 103 included in the optical disc device described above will be described in detail with reference to FIG. 3. The optical pickup 103, for example, records information onto the optical disc 100 or plays back information on the optical disc 100 with a laser beam LS at a wavelength 2, of 405 nm. Recording layers L0 and L1 are formed within the optical disc 100. The recording layer L1 is located to the front of the recording layer L0 in a direction in which the laser beam LS is incident on the optical disc 100. A laser diode (LD) 2 emits the laser beam LS.

The laser beam LS passes through a polarizing beam splitter (PBS) 3, a collimator lens 4, and a quarter-wave plate (QWP) 5, which is an example of a polarizing element, and is focused onto the optical disc 100 through the objective lens 6. The laser beam LS is focused, for example, onto the recording layer L0. The polarizing beam splitter 3 has a splitting surface that is, for example, configured to transmit a P-polarization component with transmittance of substantially 100% and reflect an S-polarization component with reflectance of substantially 100%.

Thus, substantially 100% of the laser beam LS emitted from the laser diode 2 is transmitted through the polarizing beam splitter 3 as a P-polarization component. The laser beam LS that has been transmitted through the polarizing beam splitter 3 is collimated by the collimator lens 4. The collimated laser beam emitted from the collimator lens 4 is converted into a circularly polarized laser beam from the linearly polarized laser beam through the quarter-wave plate 5. The circularly polarized laser beam converted through the quarter-wave plate 5 is focused onto the recording layer L0 or the recording layer L1 of the optical disc 100 by the objective lens 6. Then, a reflected beam is generated from the recording layer L0 or the recording layer L1 that has been irradiated with the laser beam LS.

The reflected beam from the recording layer L0 or the recording layer L1 of the optical disc 100 travels through the same optical path and is collimated by the objective lens 6. The collimated reflected beam emitted from the objective lens 6 is then converted into a linearly polarized laser beam (S-polarization component) from the circularly polarized laser beam through the quarter-wave plate 5. The linearly polarized laser beam again passes through the collimator lens 4 and is incident on the polarizing beam splitter 3 as an S-polarization component. The laser beam that is incident on the polarizing beam splitter 3 as an S-polarization component is reflected by the polarizing beam splitter 3 with reflectance of substantially 100%.

A part of the laser beam that has been reflected by the polarizing beam splitter 3 is blocked by a mask 7, which serves as a shading unit. The mask 7 will be described later in detail. The laser beam that has passed through the mask 7 is given predetermined astigmatism by a cylindrical lens 8. The laser beam to which the astigmatism has been given is focused onto a light receiving face of a photodetector 9. The photodetector 9 includes a light receiving cell that carries out photoelectric conversion on the laser beam incident on the light receiving face. The light receiving cell is divided into four regions A to D by a dividing line that corresponds to a tangential direction (track direction) of the optical disc 100 and by a dividing line that corresponds to a radial direction of the optical disc 100. The photodetector 9 outputs electrical signals in accordance with the quantity of light received in the respective regions A to D of the light receiving cell.

Figure 4:
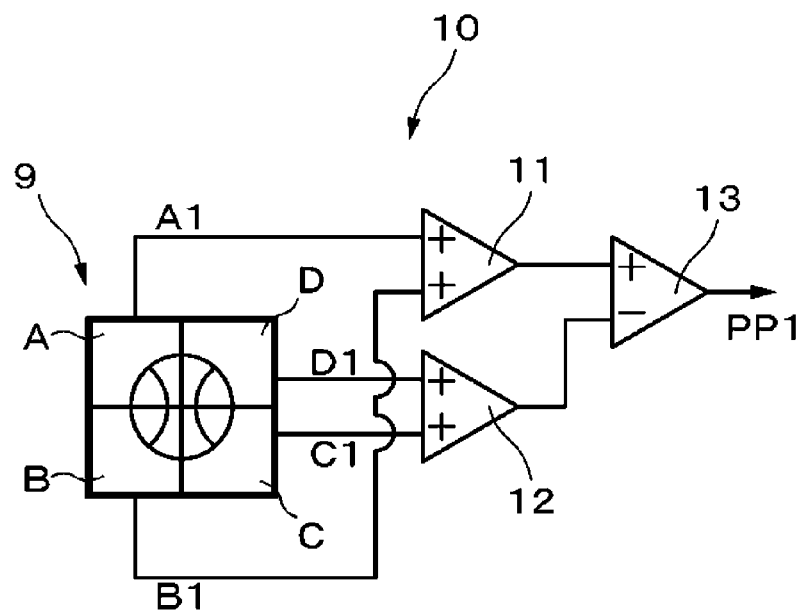
FIG. 4 is a block diagram illustrating a configuration for generating a tracking error signal.

Output signals of the respective regions A to D of the photodetector 9 are illustrated in FIG. 4 along with an example of a tracking error detection circuit 10. By carrying out an operation on the outputted electrical signals, a main data signal, a tracking error signal, and a focus error signal are calculated.

A method for calculating a tracking error signal will be described. An electrical signal A1 is outputted in the region A of the light receiving cell. Similarly, an electrical signal B1 is outputted in the region B of the light receiving cell, an electrical signal C1 is outputted in the region C of the light receiving cell, and an electrical signal D1 is outputted in the region D of the light receiving cell. The tracking error detection circuit 10 includes adders 11 and 12 and a subtracter 13. A tracking error signal PP1 (main push pull signal) through a push pull method is calculated through the following formula (1). Note that the main signal is obtained by adding the signals of the entire regions A to D.

$$PP1=(A1+B1)-(C1+D1) \tag{1}$$

Figure 5:
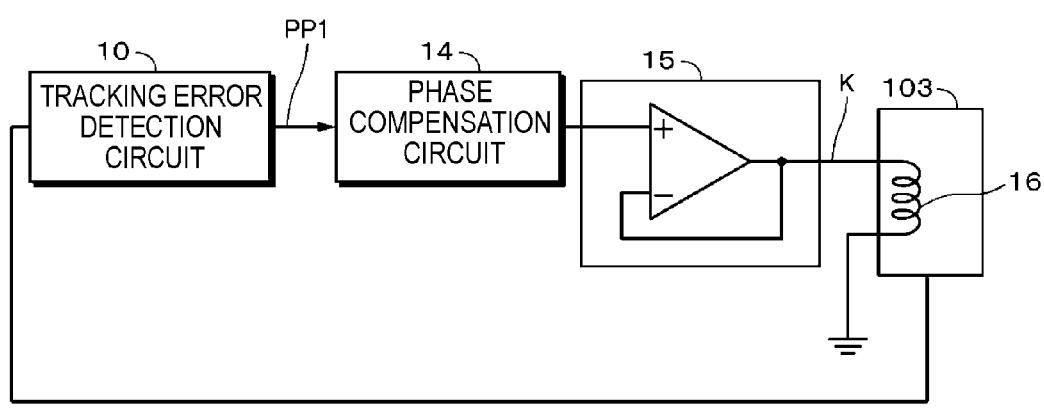
FIG. 5 is a block diagram illustrating an example of a configuration of a driving unit for tracking error correction.

FIG. 5 illustrates an example of a tracking error correction circuit. The tracking error detection circuit 10 supplies the tracking error signal PP1 to a phase compensation circuit 14. An output signal from the phase compensation circuit 14 is inputted to a voltage feedback type drive circuit 15. The drive circuit 15 outputs a drive signal K for an objective lens driving actuator. The drive signal K is inputted to a tracking coil 16 that serves as the objective lens driving actuator and that is included in the optical pickup 103. The tracking coil 16 that has received the drive signal K generates drive force in the radial direction of the optical disc 100. In this way, tracking control is carried out based on the tracking error signal PP1. Note that the configuration of the tracking servo may be different from the configuration illustrated in FIG. 5.

"Effects of Mask"

The optical pickup 103 of the first embodiment of the present disclosure includes the mask 7. The mask 7 is provided to suppress rays reflected by a signal face other than a recording/playback layer (other layer stray light) being incident on the photodetector 9 as crosstalk light. The mask 7 is provided to suppress influence of diffracted rays generated by a groove in another layer. Specifically, the mask 7 is, for example, constituted of a transparent plate coated with a belt-shaped shading material. Alternatively, a shading function may be added to a part of the optical components in the optical pickup 103. A configuration in which a belt-shaped shading unit is attached to a frame is also possible. Furthermore, the shape of the mask is not limited to a rectangular shape and may be circular, elliptical, or the like to surround a position at which a 1st order ray of the other layer stray light substantially concentrates.

Figure 6:
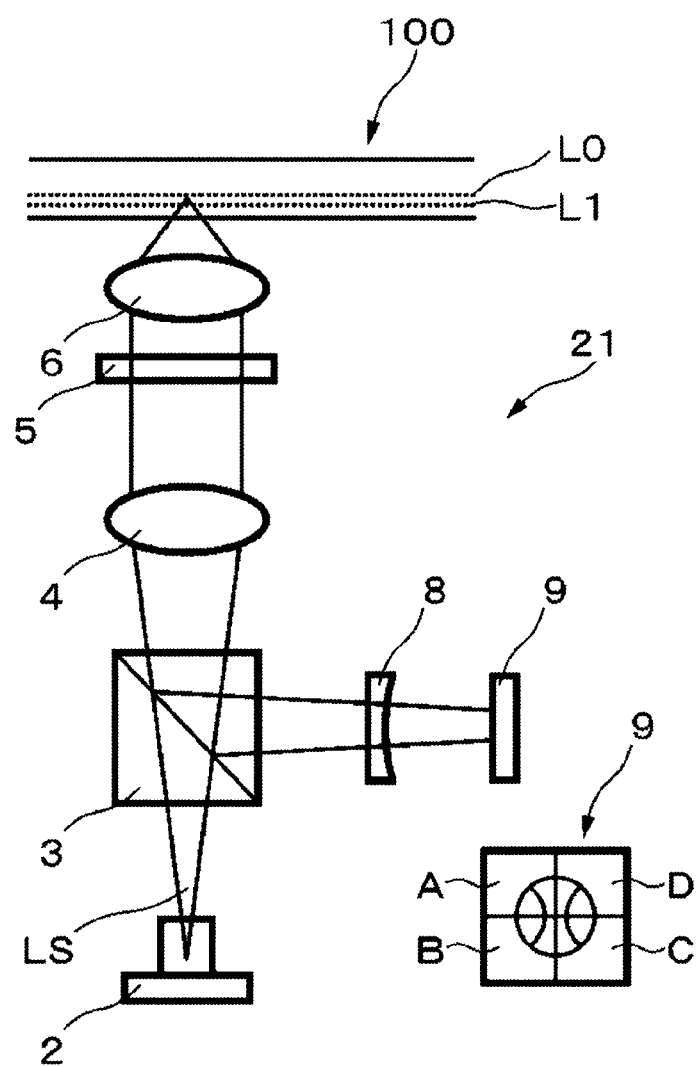
FIG. 6 is a schematic diagram illustrating an optical pickup that lacks a shading unit.

The mask 7 of the first embodiment of the present disclosure will be described. To facilitate understanding, a false tracking error signal that is generated in an optical pickup that does not include the mask 7 will be described. FIG. 6 illustrates a configuration in which the mask 7 is excluded from the optical system of the optical pickup 103 of the first embodiment of the present disclosure. That is, an optical pickup 21 that is not provided with countermeasures against generation of a false tracking error signal is illustrated. Note that the optical pickup 21 illustrated in FIG. 6 has an identical configuration to the optical pickup 103 illustrated in FIG. 3 except in that the optical pickup 21 does not include the mask 7.

Figure 7:
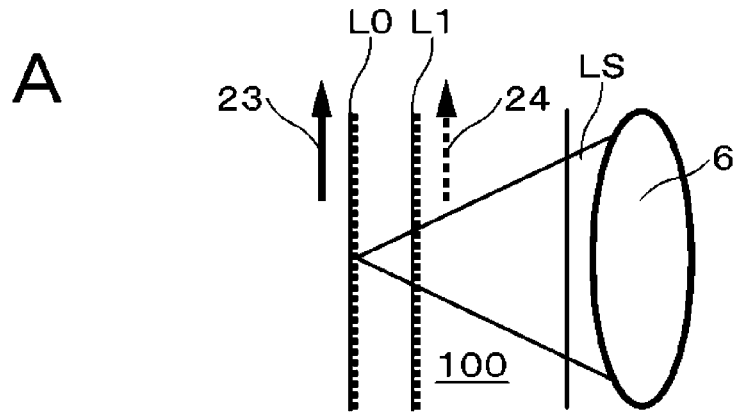
FIGS. 7A and 7B are schematic diagrams for describing a positional relationship between a recording layer and an adjacent layer in an optical disc.

Each of FIGS. 7A and 7B illustrates a positional relationship between a recording/playback layer and another layer in the optical disc 100. As illustrated in FIG. 7A, when the L0 layer is the recording/playback layer, the laser beam LS focused by the objective lens 6 forms a focal spot on the L0 layer. Accordingly, the L1 layer located to the front in a direction in which the laser beam LS is incident is taken as the other layer, and the laser beam reflected by the L1 layer is the other layer stray light.

When the L0 layer is the recording/playback layer, the laser beam LS is focused onto the spiral groove formed in the L0 layer, and the spot of the laser beam moves in the radial direction (direction that crosses the groove) of the optical disc 100, as indicated by an arrow 23. At that time, the spot of the laser beam also moves across the L1 layer, which is the other layer, in a direction indicated by an arrow 24.

On the other hand, as illustrated in FIG. 7B, when the L1 layer is the recording/playback layer, the laser beam LS is focused onto the spiral groove formed in the L1 layer, and the spot of the laser beam moves in the radial direction (direction that crosses the groove) of the optical disc 100, as indicated by an arrow 27. At that time, the spot of the laser beam also moves across the L0 layer, which is the other layer, in a direction indicated by an arrow 26.

Figure 8:
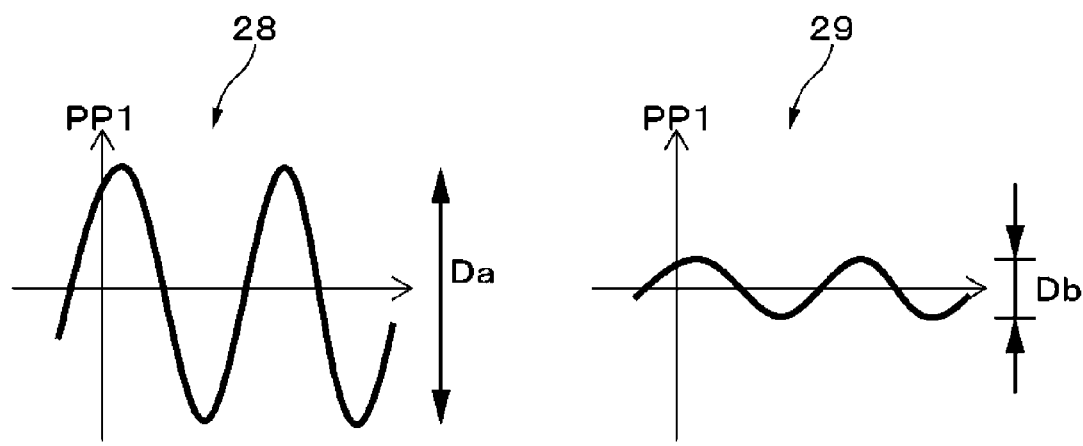
FIG. 8 is a schematic diagram for describing a tracking error signal and a false tracking error signal.

FIG. 8 illustrates examples of a tracking error signal 28 and a false tracking error signal 29 that are generated when the spot of the laser beam is moved in the radial direction of the optical disc 100 as described above. The tracking error signal 28 is generated for a tracking error, and the false tracking error signal 29 is generated for a deviation in a track on the other layer.

To be more specific, when recording onto or playing back the L0 layer (FIG. 7A), the tracking error signal 28 is obtained from the L0 layer, and the false tracking error signal 29 is generated from the L1 layer, which is the other layer. When recording onto or playing back the L1 layer (FIG. 7B), the tracking error signal 28 is obtained from the L1 layer, and the false tracking error signal 29 is generated from the L0 layer, which is the other layer. The tracking error signal 28 has a peak-to-peak value Da. The false tracking error signal 29 has a peak-to-peak value Db. Normally, the other layer stray light is less intense than the signal light, and thus the amplitude of the obtained false tracking error signal is smaller than that of the tracking error signal.

Figure 9:
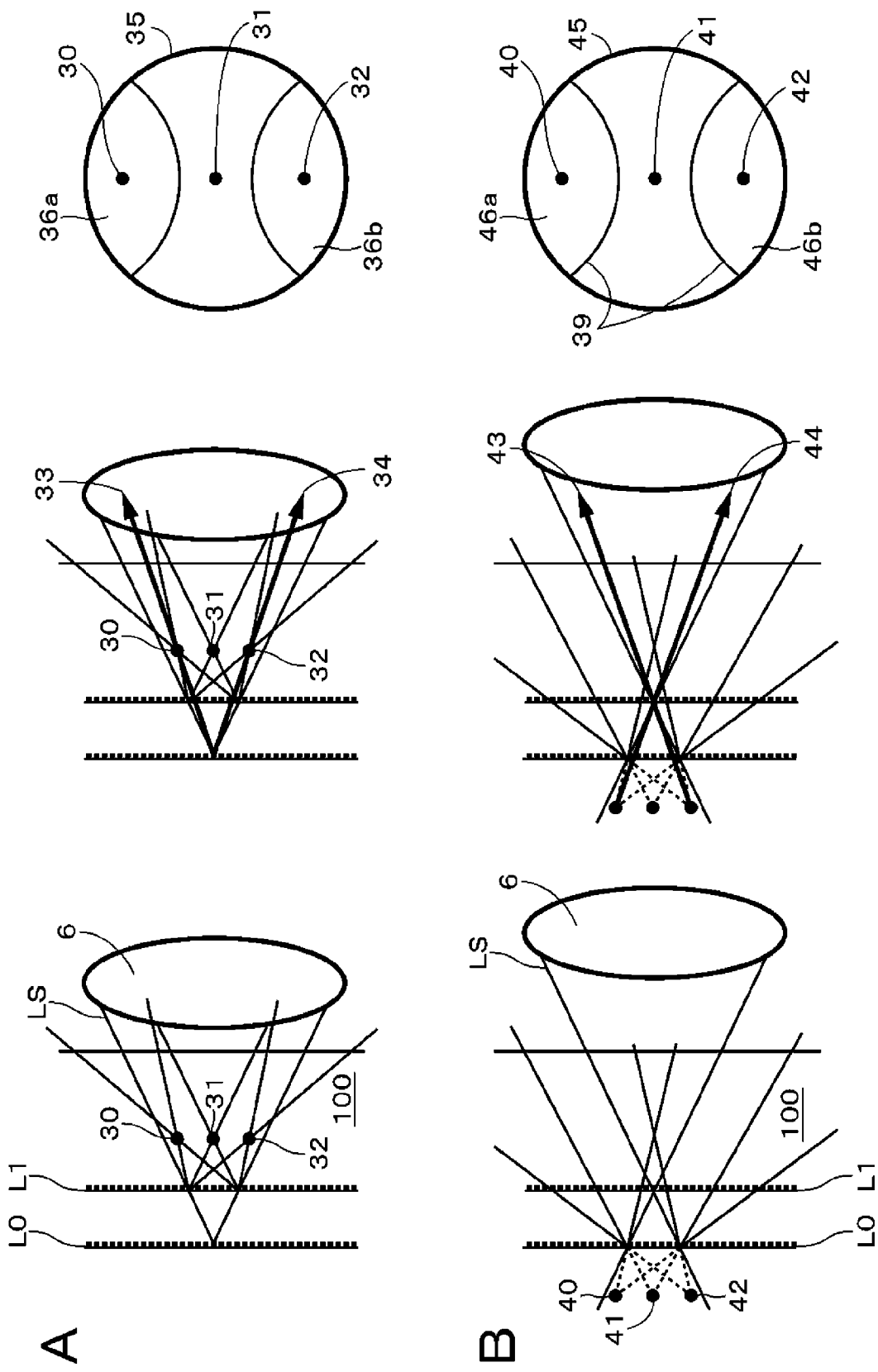
FIGS. 9A and 9B are schematic diagrams for describing reflected rays and diffracted rays from a recording/playback layer and another layer.

Furthermore, reflected rays and diffracted rays from the other layer will be described with reference to FIGS. 9A and 9B. FIG. 9A illustrates a case where the recording/playback layer is the L0 layer. As illustrated in FIG. 9A, the laser beam LS is focused onto the L0 layer through the objective lens 6. The L1 layer, which is the other layer, functions as a reflective diffraction grating, and returning rays are split into the 0th order ray and the ±1st order rays in directions that cross the groove as being diffracted by the groove. The 0th order ray concentrates around a point 31, the +1st order ray concentrates around a point 30, and the −1st order ray concentrates around a point 32. As a result, interfered rays of the signal light from the L0 layer and the ±1st order rays from the L1 layer travel in directions indicated by arrows 33 and 34.

An optical distribution of the returning rays from the L1 layer as viewed from the front is also illustrated. In this distribution, a 0th order ray 35 of the signal light has a circular spread, and a +1st order ray 36a and a −1st order ray 36b are distributed so as to partially overlap with the 0th order day 35. In the aforementioned hypothetical position, the returning rays concentrate at the points 30, 31, and 32, respectively.

FIG. 9B illustrates a case where the recording/playback layer is the L1 layer. As illustrated in FIG. 9B, the laser beam LS is focused onto the L1 layer through the objective lens 6. The L0 layer, which is the other layer, functions as a reflective diffraction grating, and returning rays are split into the 0th order ray and the ±1st order rays in directions that cross the groove as being diffracted by the groove. The 0th order ray concentrates around a point 41, the +1st order ray concentrates around a point 40, and the −1st order ray concentrates around a point 42. As a result, interfered rays of the signal light from the L1 layer and the ±1st order rays from the L0 layer travel in directions indicated by arrows 43 and 44.

An optical distribution of the returning rays from the L0 layer as viewed from the front is also illustrated. In this distribution, a 0th order ray 45 of the signal light has a circular spread, and a +1st order ray 46a and a −1st order ray 46b are distributed so as to partially overlap with the 0th order ray 45. In the aforementioned hypothetical position, the returning rays concentrate at the points 40, 41, and 42, respectively.

Figure 10:
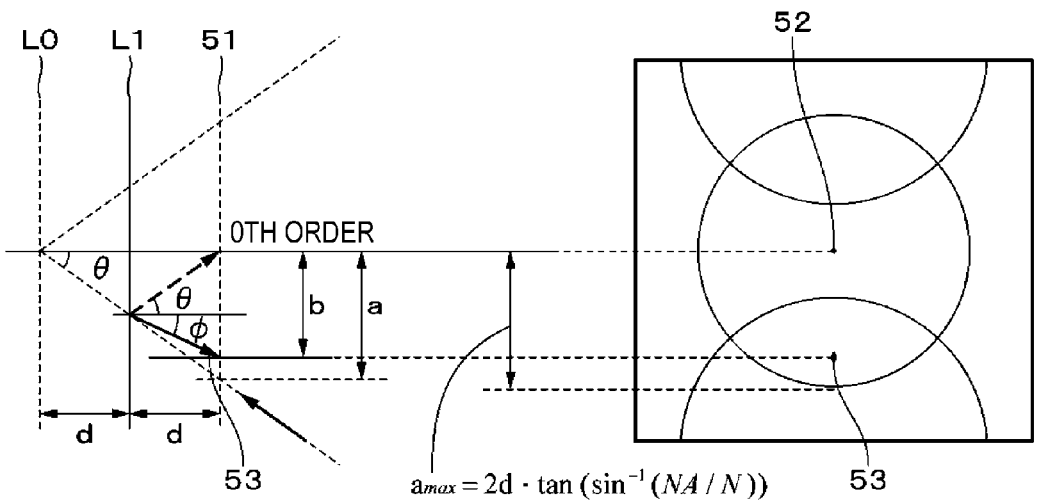
FIG. 10 is a schematic diagram for describing a spot position of stray light generated through diffraction on another layer.

An example of a method for calculating a spot position of stray light will described with reference to FIG. 10. An example in which the L0 layer is the recording/playback layer will be described. The spot position of the stray light along a position 51 that is at a predetermine distance from the optical disc on the side at which the laser beam LS is incident on the optical disc will be calculated. A reflected ray (i.e., the 0th order ray indicated by a dotted line) of the laser beam that is incident on the other layer (i.e., L1 layer) is reflected at a reflection angle θ and enters a point 52 on the position 51. The point 52 is the center position of the spot of the 0th order ray reflected by the L0 layer.

The 1st order ray (e.g., −1st order ray) among diffracted rays generated as being diffracted by the groove in the L1 layer is reflected at an angle φ and reaches a point 53 on the position 51.

When a distance between the L0 layer and the L1 layer is taken as d, a focal point of the 0th order ray of rays reflected by the L1 layer lies along the position 51 and is distanced from the L1 layer by d. A distance from the optical axis to a point at which an arbitrary light ray that is to be incident on the optical disc passes through the position 51 is taken as a, and a distance from the optical axis to a point at which the 1st order diffracted ray from the L1 layer returns to the position 51 is taken as b. In addition, a distance from the optical axis to an incident light ray of a maximum angle on the position 51 is taken as amax. Furthermore, a ratio KK is (b/amax). In this case, the ratio KK can be obtained through the following formula. N is a refractive index.

$$\frac{\lambda}{NP} + \sin\theta = \sin\phi$$

$$a = N\sin\theta$$

$$-NA \le a \le NA$$

$$\frac{\lambda}{NA} - \frac{a}{N} = \sin\phi$$

$$\tan\phi = \tan\left(\sin^{-2}\left(\frac{\lambda}{NP} - \frac{a}{N}\right)\right)$$

$$\tan\theta = -\tan(\sin^{-1}(a/N))$$

$$KK = \frac{\tan\phi + \tan\theta}{-2\tan(\sin^{-1}(NA/N))}$$

Figure 11:
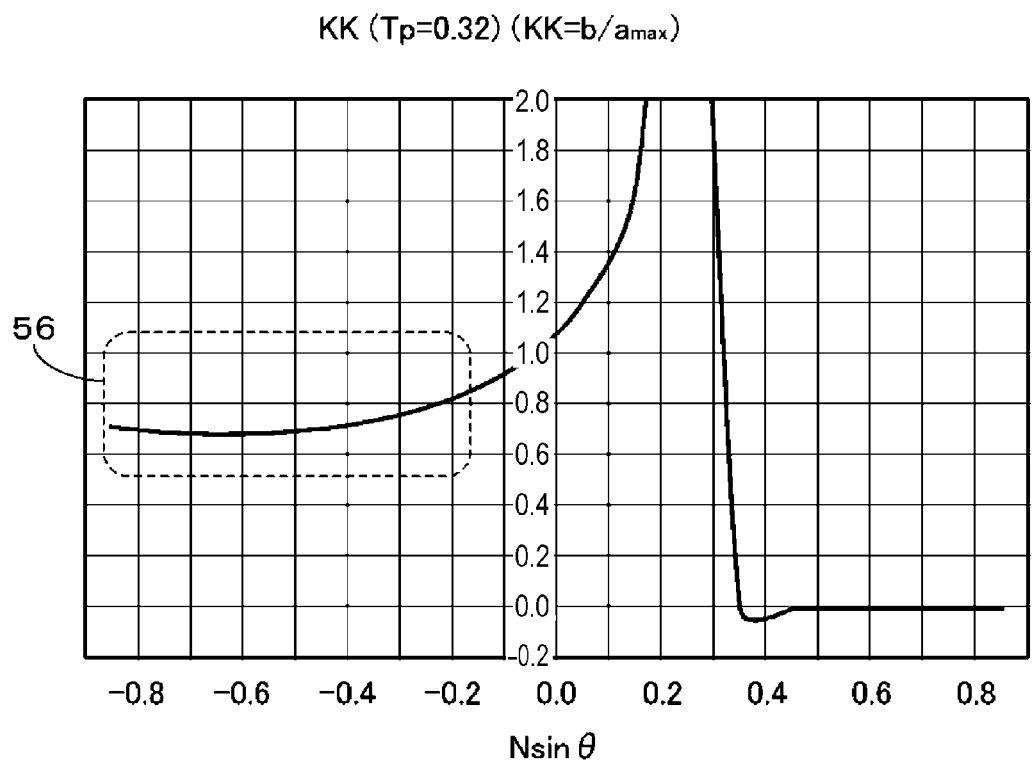
FIG. 11 is a graph illustrating a calculation result of the spot position of the stray light.

A simulation result of the value of the ratio KK when a track pitch P is 0.32 µm is illustrated in FIG. 11. The other layer stray light to be detected (N sin θ<1) forms a focal spot within a range 56 indicated by a dotted line in FIG. 11. The value of the ratio KK is substantially constant within the range 56, and thus the other layer stray light (e.g., −1st order ray) concentrates at the point 53. Preferably, the mask 7 is disposed at a location at which the other layer stray light concentrates (i.e., a location at which the value of the ratio KK is substantially constant, as described above) to reduce influence of the other layer stray light. Note that the points 52 and 53 in FIG. 10 correspond, respectively, to the points 31 and 32 in FIG. 9A.

The function of the mask 7 in the optical pickup 103 of the first embodiment of the present disclosure will be described. Each of FIGS. 12A and 12B illustrates a positional relationship of a returning ray distribution and the mask 7. The mask 7 includes a belt-shaped shading unit that extends in a direction that traverses the track. The mask 7 illustrated in FIG. 12A includes separated shading units 61a and 61b. The mask 7 illustrated in FIG. 12B includes a continuous belt-shaped shading unit 61.

The shading unit 61a of the mask 7 illustrated in FIG. 12A is provided so as to cover a point at which the +1st order ray of the other layer stray light concentrates. The mask 7 is disposed such that the shading unit 61a covers the point 30 when the L0 layer is the recording/playback layer and that the shading unit 61a covers the point 45 when the L1 layer is the recording/playback layer. The shading unit 61b of the mask 7 is provided so as to cover a point at which the −1st order ray of the other layer stray light concentrates. The mask 7 is disposed such that the shading unit 61b covers the point 32 when the L0 layer is the recording/playback layer and that the shading unit 61b covers the point 42 when the L1 layer is the recording/playback layer.

The point 31 (when the L0 layer is the recording/playback layer) or the point 41 (when the L1 layer is the recording/playback layer) at which the 0th order rays (of the signal light and the other layer stray light) concentrate is not blocked by the mask 7. Thus, components of the 0th order ray of the signal light and of the 0th order ray of the other layer stray light are not blocked. Typically, the intensity of the signal light is greater than the intensity of the other layer stray light, and thus the S/N ratio of the light receiving signal can be made preferable.

The mask 7 illustrated in FIG. 12B includes the shading unit 61 that blocks a belt-shaped region including all of the points 30 (40), 31 (41), and 32 (42) described above. Although the 0th order ray of the signal light is also blocked, the 0th order ray of the other layer stray light can be blocked as well.

"Removal of False Tracking Error"

Results obtained through a simulation of a distribution of the signal light and the other layer stray light on the light receiving face of the photodetector 9 while the mask 7 illustrated in FIG. 12A is used will be described with reference to FIGS. 13 to 18. As described above, the light receiving face of the photodetector 9 is divided into the four regions A to D by a dividing line that corresponds to the tangential direction (track direction) of the optical disc 100 and by a dividing line that corresponds to the radial direction of the optical disc 100. The photodetector 9 outputs electrical signals in accordance with the quantity of light received in the respective regions A to D of the light receiving cell and carries out an operation on the outputted electrical signals to calculate a main data signal, a tracking error signal, and a focus error signal.

Figure 13:
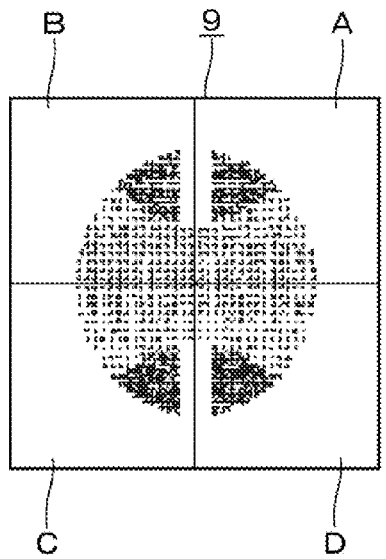
FIG. 13 is a schematic diagram illustrating a calculation result of a distribution of signal light on a light receiving face of a photodetector.

FIG. 13 illustrates only a distribution of the signal light on the light receiving face of the photodetector 9. Each of the regions A to D of the light receiving face is irradiated with the 0th order ray and the ±1st order rays of the signal light.

Figure 14:
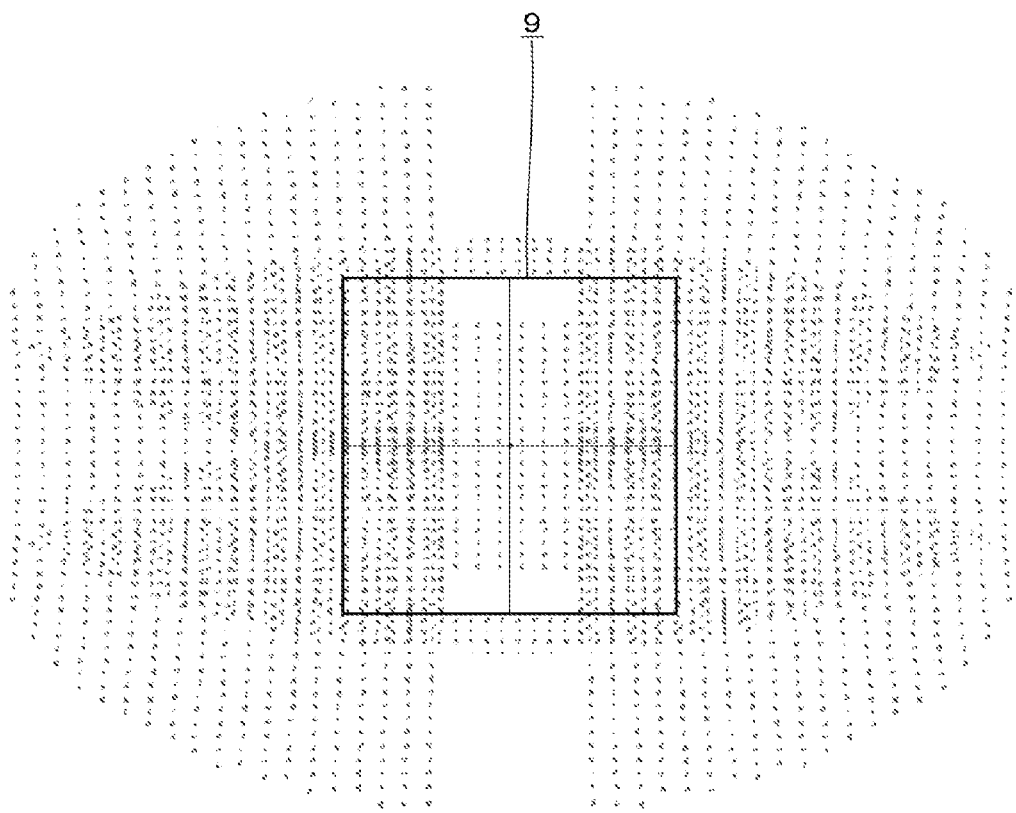
FIG. 14 is a schematic diagram illustrating a calculation result of a distribution of other layer stray light on a light receiving face of a photodetector.

FIG. 14 illustrates only a distribution of the other layer stray light on the light receiving face of the photodetector 9. Each of the regions A to D of the light receiving face is irradiated with the 0th order ray and the ±1st order rays of the other layer stray light.

Figure 15:
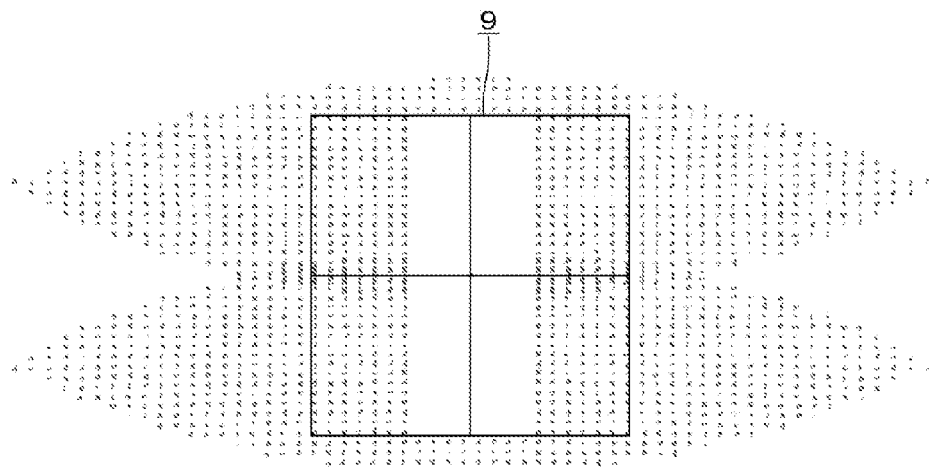
FIG. 15 is a schematic diagram illustrating a calculation result of a distribution of ±1st order rays of the other layer stray light on a light receiving face of a photodetector.

FIG. 15 illustrates only a distribution of the ±1st order rays of the other layer stray light on the light receiving face of the photodetector 9. Each of the regions A to D of the light receiving face is irradiated with the ±1st order rays of the other layer stray light.

Figure 16:
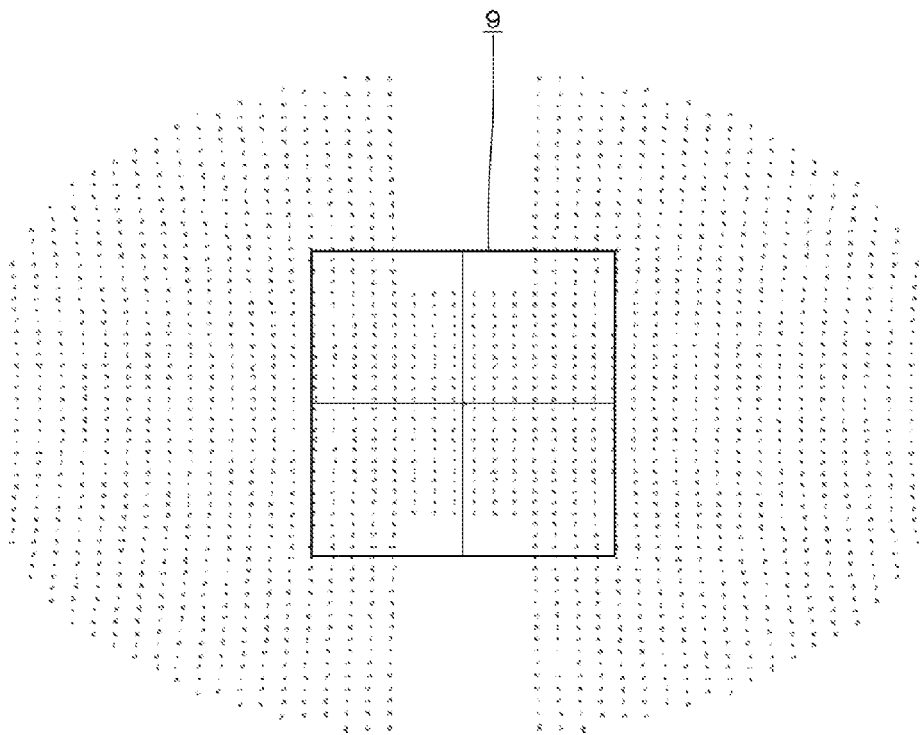
FIG. 16 is a schematic diagram illustrating a calculation result of a distribution of a 0th order ray of the other layer stray light on a light receiving face of a photodetector.

FIG. 16 illustrates only a distribution of the 0th order rays of the other layer stray light on the light receiving face of the photodetector 9. Each of the regions A to D of the light receiving face is irradiated with the 0th order rays of the other layer stray light. FIG. 14 is obtained by synthesizing the distributions illustrated in FIGS. 15 and 16.

Figure 17:
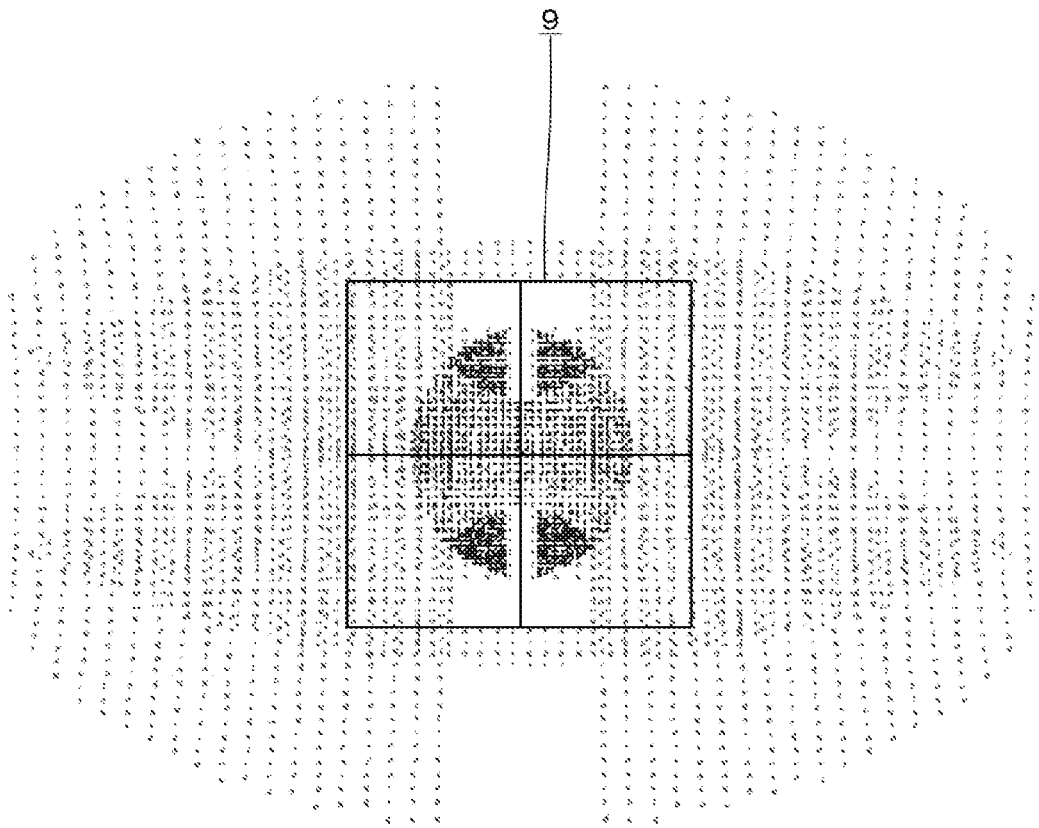
FIG. 17 is a schematic diagram illustrating a calculation result of a distribution of signal light and other layer stray light on a light receiving face of a photodetector.

FIG. 17 illustrates a distribution of the signal light and a distribution of the other layer stray light on the light receiving face of the photodetector 9. Each of the regions A to D of the light receiving face is irradiated with the 0th order ray and the ±1st order rays of the signal light and also irradiated with the 0th order ray and the ±1st order rays of the other layer stray light.

Figure 18:
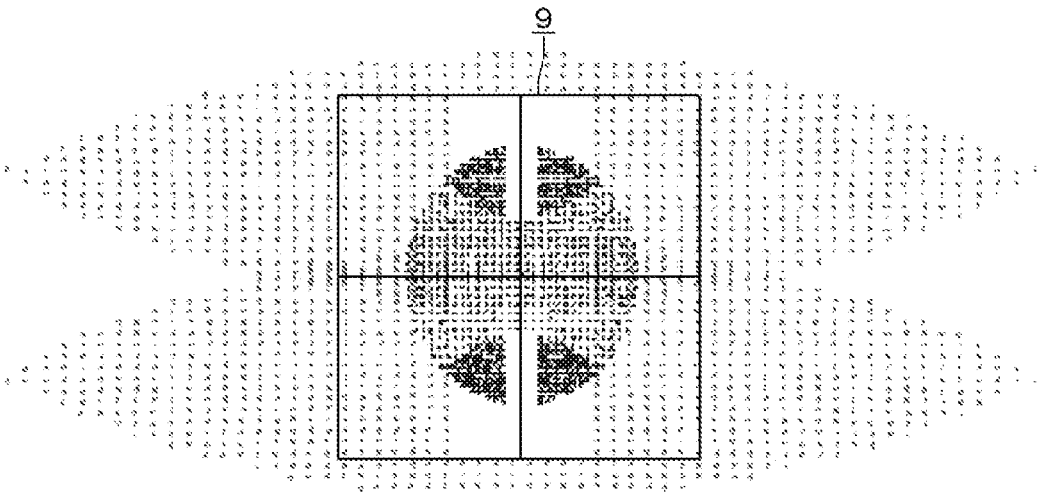
FIG. 18 is a schematic diagram illustrating a calculation result of a distribution of ±1st order rays of other layer stray light and signal light on a light receiving face of a photodetector.

FIG. 18 illustrates a distribution of the signal light and a distribution of ±1st order rays of the other layer stray light on the light receiving face of the photodetector 9. Each of the regions A to D of the light receiving face is irradiated with the 0th order ray and the ±1st order rays of the signal light and also irradiated with the 0th order ray and the ±1st order rays of the other layer stray light. FIG. 18 is obtained by synthesizing FIGS. 13 and 15.

Figure 19:
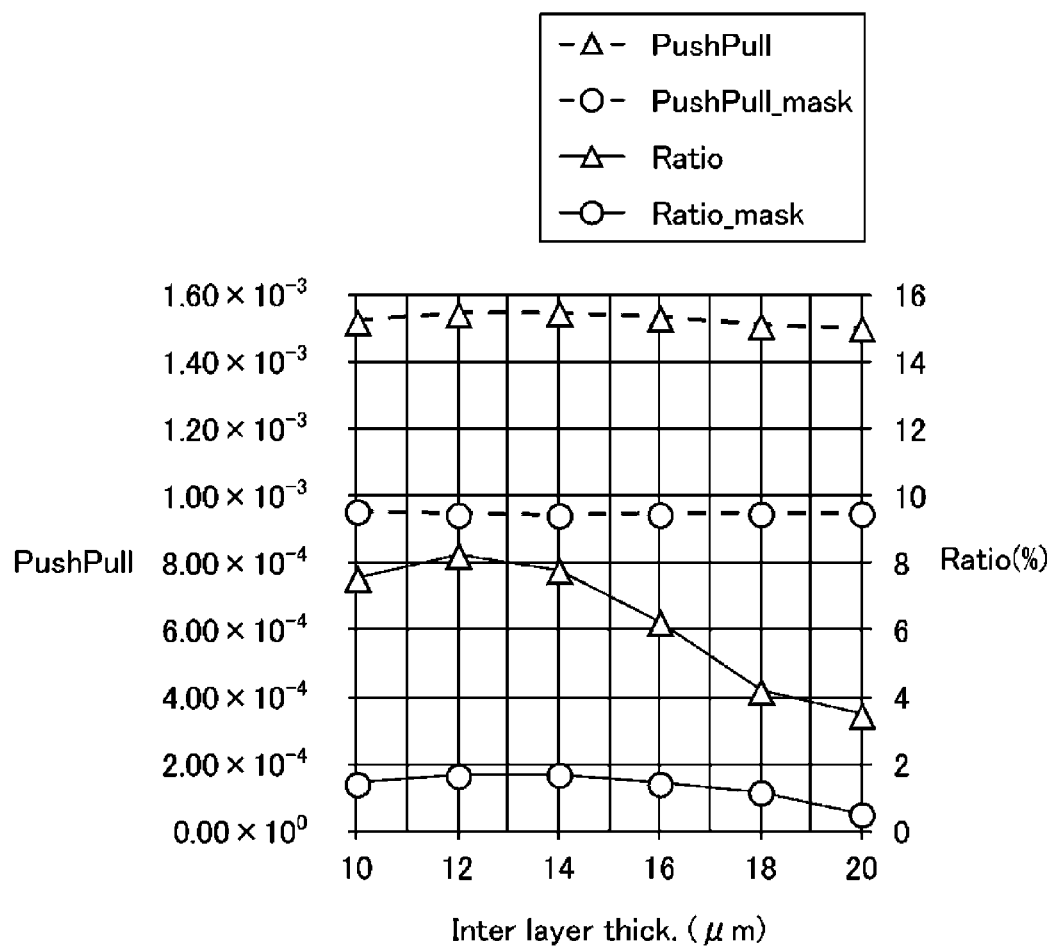
FIG. 19 is a graph for describing advantageous effects of the first embodiment of the present disclosure.

A calculation result of removal of the false tracking error by the mask 7 in the first embodiment of the present disclosure is illustrated in FIG. 19. Here, the L0 layer, for example, is the recording/playback layer. In FIG. 19, the amplitude and the ratio of the push pull signal are illustrated. The ratio is obtained as (Db/Da). Here, Da is the peak-to-peak value of the tracking error signal 28 and Db is the peak-to-peak value of the false tracking error signal 29, as described with reference to FIG. 8. Thus, as the ratio is smaller, relative amplitude of the false tracking error signal 29 caused by the other layer stray light is smaller. As illustrated in FIG. 19, providing the mask 7 can reduce the ratio further than in a case where the mask 7 is not provided, regardless of the value of the interlayer thickness.

The calculation conditions are as follows.

$\lambda$ (wavelength of the laser beam)=405 nm
NA (numerical aperture of the objective lens)=0.85
Tp (track pitch)=0.32 μm
Groove Duty=33%
Groove Depth=$\lambda/12$
L0:R=3%
L1:R=3%
T=100%
Mask Width=14% of Aperture Diameter
Detection System Main-PP, As:W22=1.6$\lambda$.

Note that the effect of removing the tracking error can be obtained similarly with either of the mask 7 including separated shading units (FIG. 12A) and the mask 7 including a continuous shading unit (FIG. 12B). Further, the tracking error can be removed similarly in a case where the L1 layer serves as the recording/playback layer.

In addition, the first embodiment of the present disclosure can be applied to a multilayer optical disc other than the dual layer optical disc. In the first embodiment of the present disclosure, the angle of the ±1st order rays of the other layer stray light is determined by the groove pitch in the other layer, and the other layer stray light passes through the optical axis and travels in a set direction that is perpendicular to the track.

Thus, the center position of the stray light on the photodetector does not depend on the interlayer spacing. Accordingly, even in a case of the multilayer optical disc having three or more layers, the stray light can be removed with a belt-shaped shade.

According to the first embodiment of the present disclosure, an optical pickup and an optical disc device with improved tracking stability in a multilayer optical disc can be provided. The optical pickup and the optical disc device according to the first embodiment of the present disclosure are capable of improving tracking stability in recording onto or playing back the multilayer optical disc, which makes it possible to achieve an optical disc with higher density. In addition, the false tracking error signal increases when the reflectance of the other layer is high. However, the optical pickup and the optical disc device of the first embodiment of the present disclosure are capable of removing the false tracking error signal, and thus a setting range of the reflectance in the multilayer optical disc is increased, and a low-cost optical disc can be realized.

2. Second Embodiment of Present Disclosure

Figure 20:
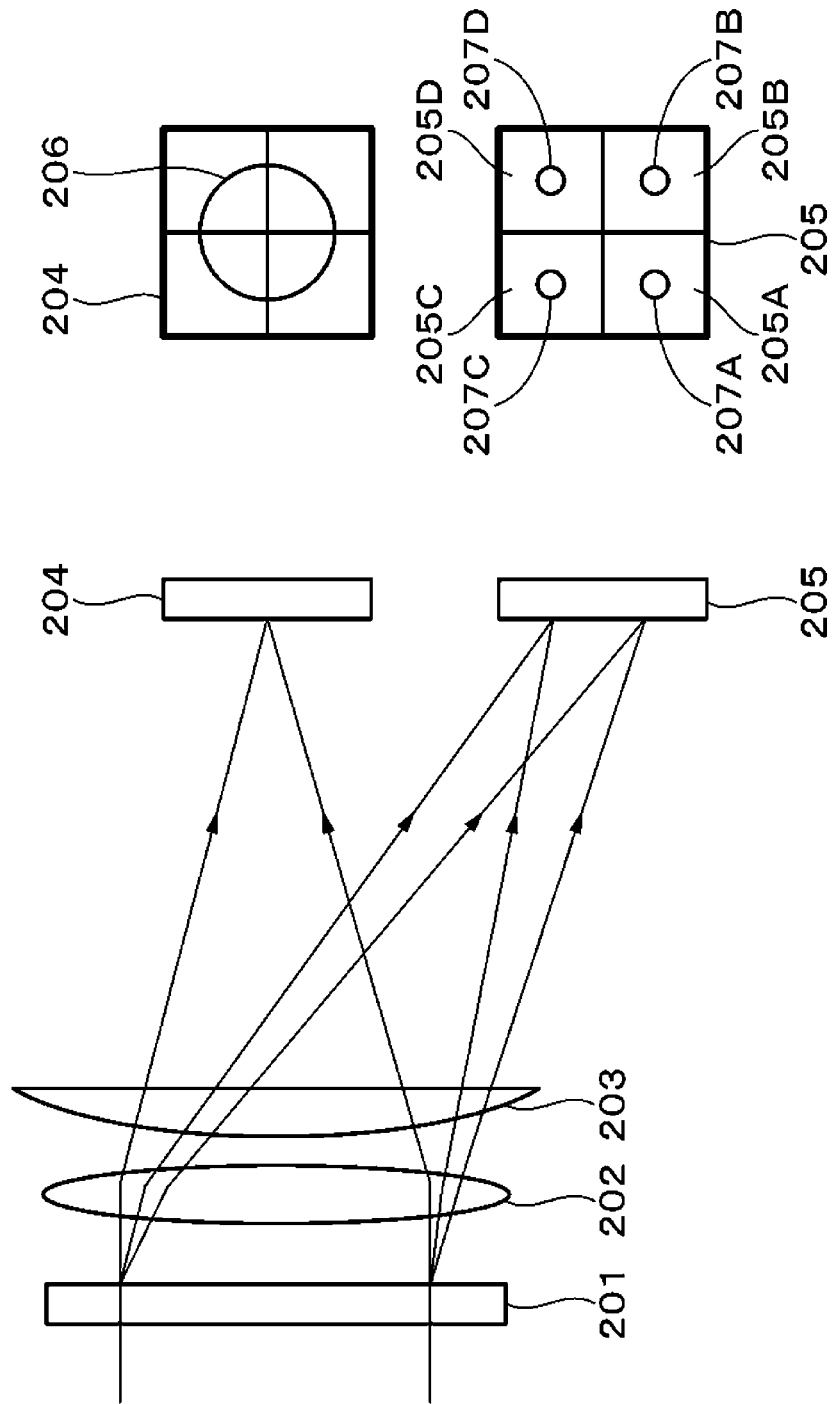
FIG. 20 is a schematic diagram for describing tracking error detection in a second embodiment of the present disclosure.
Figure 21:
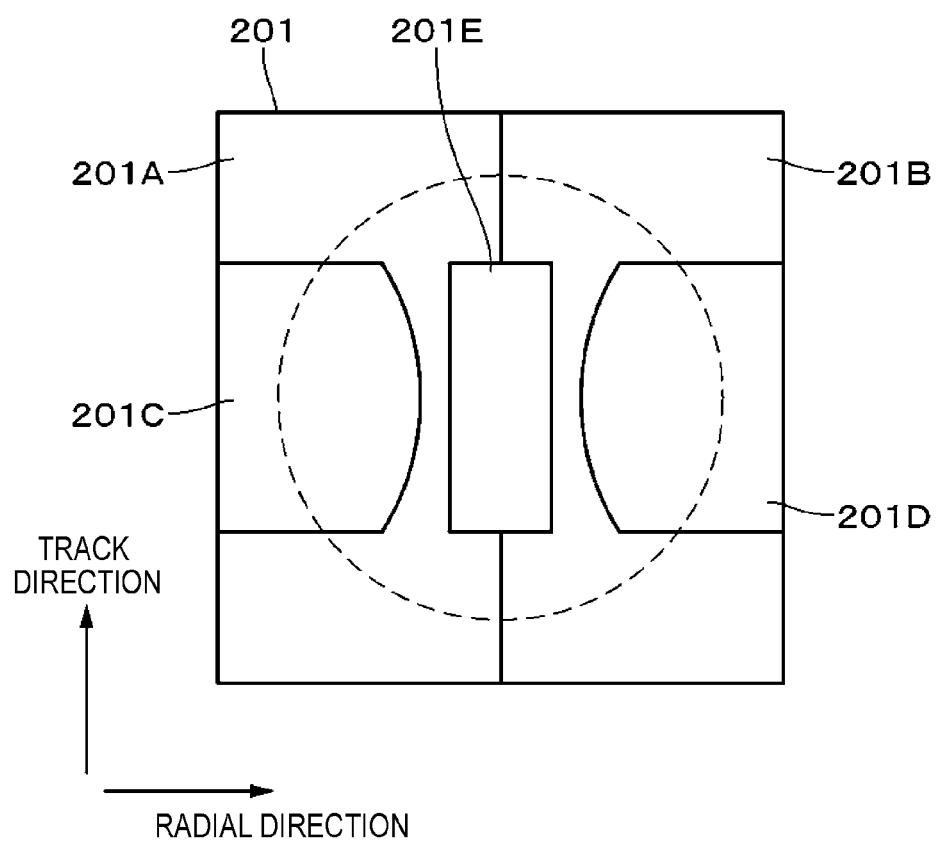
FIG. 21 is a schematic diagram illustrating a pattern of a holographic optical element (HOE) to be used in the tracking error detection.
Figure 22:
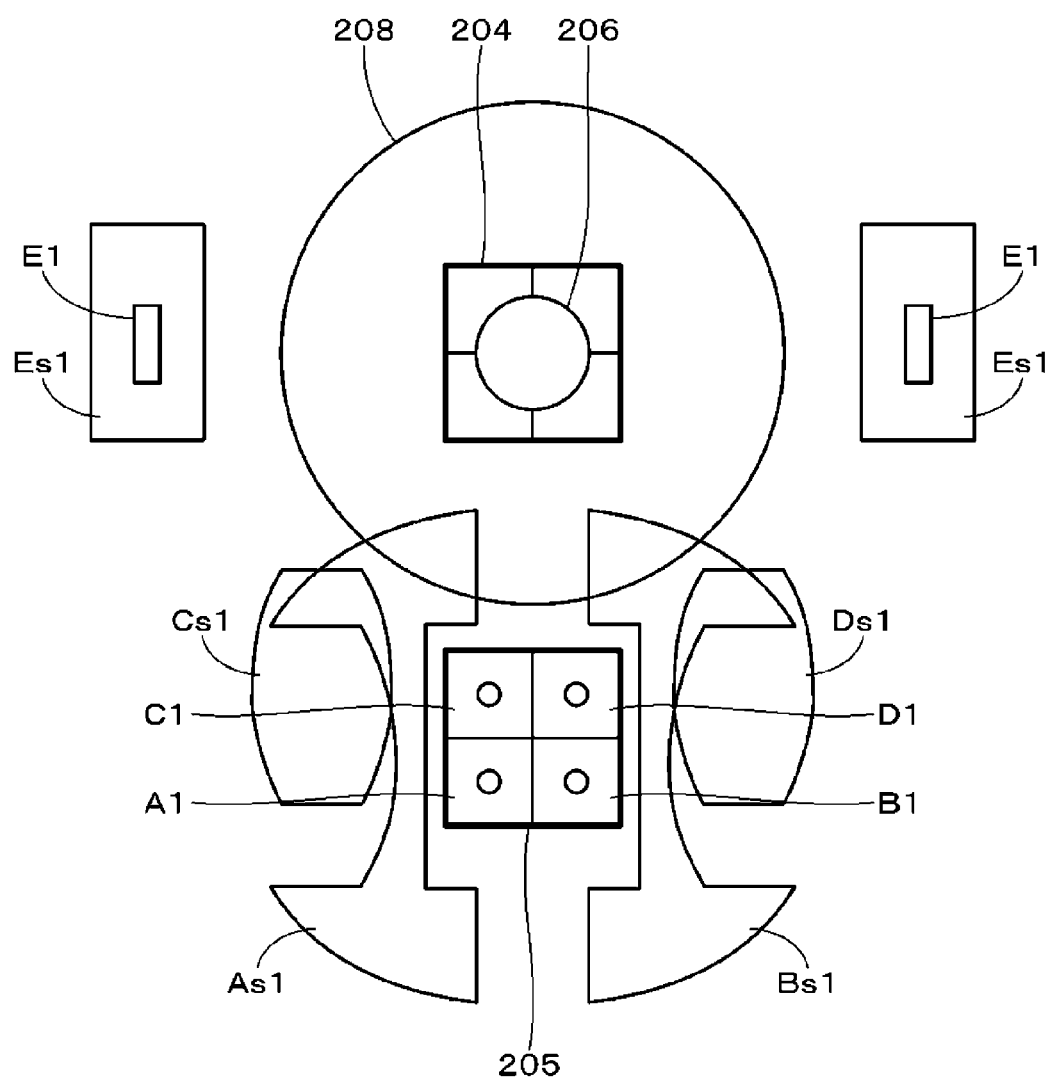
FIG. 22 is a schematic diagram illustrating a positional relationship between a photodetector and other layer stray light.

A second embodiment of the present disclosure is applied to an improved advanced push pull (APP) method. First, the improved APP method will be described with reference to FIGS. 20, 21, and 22. FIG. 20 illustrates an optical configuration of an optical pickup, FIG. 21 illustrates a pattern of a hologram optical system to be used in a detection system of the optical pickup, and FIG. 22 illustrates an example of the other layer stray light in the optical pickup. Reflected rays from the signal face of the optical disc pass through a holographic optical element (HOE) 201 without being diffracted thereby. Then, the reflected rays are converged by a lens 202 and are incident on a focus photodetector (PD) 204 through a cylindrical lens 203.

A tracking photodetector 205 is also provided. Reflected rays from the signal face of the optical disc are diffracted by the HOE 201 and are incident on the tracking photodetector 205 through the lens 202 and the cylindrical lens 203.

The focus photodetector 204 has a light receiving face that is divided into four regions and receives a spot 206. The tracking photodetector 205 has a light receiving face that is divided into four regions 205A to 205D. The regions 205A to 205D receive, respectively, spots A1, B1, C1, and D1 of rays that have been diffracted by the HOE 201.

The HOE 201 has a pattern as illustrated in FIG. 21. The HOE 201 is divided into five regions 201A to 201E. The regions 201A and 201B are sub-regions, the regions 201C and 201D are main regions, and the region 201E is a center region. A circle indicated by a broken line indicates an outer circumference of a reflected light beam from the optical disc.

The tracking error signal is generated by calculating $(c-d)-k(a-b)$. Here, a to d represent signals that are obtained by receiving, by the tracking photodetector 205, information rays diffracted by the respective regions 201A to 201D of the HOE 201, and k is a constant.

FIG. 22 illustrates a positional relationship of the photodetectors 204 and 205 and the reflected rays from the optical disc. The optical disc, for example, is a dual layer BD. For example, stray light is generated as being reflected by a semitransparent layer (L1 layer) located to the front of the signal face (L0 layer) to be played back in the dual layer BD. The light beam reflected by the signal face of the optical disc is incident on the HOE 201 illustrated in FIG. 22, and a part of the light beam is diffracted.

In FIG. 22, A1 to E1 indicate diffracted rays generated as the information rays (e.g., reflected rays from the L0 layer) are incident on the respective regions 201A to 201E, and As1 to Es1 indicate diffracted rays generated as the other layer stray light (e.g., reflected rays from the L1 layer) is incident on the respective regions 201A to 201E. There are two sets of the diffracted rays E1 and Es1, and each set includes the 1st order diffracted ray and its conjugate ray.

The light beam that has passed through the HOE 201 is given astigmatism by the cylindrical lens 203 and then is received by the focus photodetector 204. Other layer stray light 208 for a focus light beam diverges around the focus photodetector 204. The tracking photodetector 205 is provided at a position distanced from the focus photodetector 204 so that the other layer stray light 208 of the 0th order ray (see FIG. 22) is not incident on the light receiving face of the tracking photodetector 205.

In addition, by diffracting the diffracted ray E1 of the information rays generated in the region 201E of the HOE 201 toward a position greatly distanced from the tracking photodetector 205, the diffracted ray Es1 of the other layer stray light to be generated in the region 201E is also diffracted toward a distanced position. That is, the diffracted ray Es1 of the other layer stray light is prevented from being incident on the tracking photodetector 205.

In this way, by providing the region 201E at the center of the HOE 201 and causing the center of the incident light beam to coincide with the center of the HOE 201, the diffracted ray E1 of the information rays and the diffracted ray Es1 of the other layer stray light are located on the same axis. Here, the information rays and the other layer stray light have different focal positions. Therefore, by providing the tracking photodetector 205 at a position aside from the center of the HOE 201, the diffracted rays A1 to D1 of the information rays and the diffracted rays As1 to Ds1 of the other layer stray light generated in the respective regions 201A to 201D are located at different positions on the photodetector 205.

Accordingly, when recording information onto or playing back information on a desired information recording layer, by causing the diffracted rays A1 to D1 of the information rays generated in the respective regions 201A to 201D to form spots on the photodetector 205, the diffracted rays A1 to D1 of the information rays and the diffracted rays As1 to Ds1 of the other layer stray light can be separated. With the use of this relationship, by providing the tracking photodetector 205 at a position at which the diffracted rays As1 to Ds1 are not received but only the diffracted rays A1 to D1 are received, the other layer stray light is prevented from being incident on the tracking photodetector 205.

Figure 23:
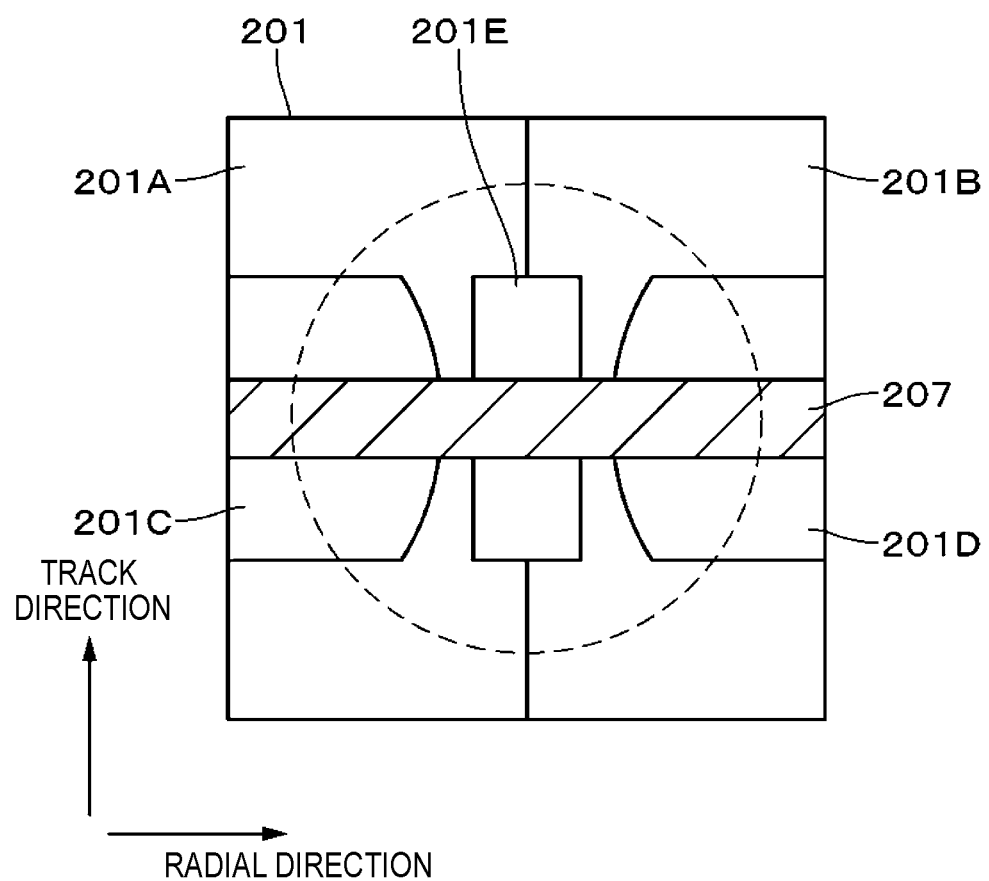
FIG. 23 is a schematic diagram illustrating a shading unit in the second embodiment of the present disclosure.

In the second embodiment of the present disclosure, as illustrated in FIG. 23, a belt-shaped mask 207 that extends in a direction (radial direction) that crosses the track direction passing through the center position of the HOE 201 is provided. The second embodiment, however, is not limited to forming the mask 207 on the HOE 201, and the mask 207 may be provided as a separate optical component.

Returning rays that have been diffracted by a groove in the other layer can be blocked by the mask 207, and the other layer stray light can be prevented from being incident on the tracking photodetector 205. Accordingly, according to the second embodiment of the present disclosure, similarly to the first embodiment, an optical pickup and an optical disc device with improved tracking stability in a multilayer optical disc can be provided. Further, since the improved APP method is combined in the second embodiment, the tracking control can be advantageously stabilized even further.

Additionally, the present technology may also be configured as below.

(1)
An optical pickup including:
a light source;
an objective lens configured to focus light from the light source onto one signal face of an optical disc, the optical disc including two or more signal faces, each of the signal faces having a groove formed therein;
a photodetector configured to receive returning rays from the optical disc, the photodetector having a light receiving face divided into four light receiving regions by a dividing line that is substantially parallel to a track direction of the optical disc and by a dividing line that is substantially perpendicular to the track direction; and
a shading unit disposed at an incident side of the photodetector and configured to block, of returning rays from a signal face other than the one signal face of the optical disc, at least a diffracted ray that is diffracted by the groove.

(2)
The optical pickup according to (1), wherein the shading unit is disposed at a position at which the diffracted ray substantially concentrates.

(3)
The optical pickup according to (2), wherein, provided that amax is a maximum value of a radius of a 0th order ray of returning rays from the one signal face and b is a distance between a center of the 0th order ray and a spot position of a 1st order ray of the returning rays from a signal face other than the one signal face, the shading unit is disposed at a position at which a ratio KK (b/amax) is substantially constant with respect to the radius of the 0th order ray along a plane where a 0th order reflected ray from a signal face other than the one signal face is focused.

(4)
The optical pickup according to (1) or (2), wherein the shading unit blocks the diffracted ray and a reflected ray from a signal face other than the one signal face.

(5)
The optical pickup according to any one of (1), (2), and (4), wherein the shading unit is constituted by a belt-shaped shading body that extends in a direction substantially perpendicular to the track direction.

(6)
The optical pickup according to any one of (1), (2), (4), and (5), wherein the returning rays from the optical disc are received by the photodetector via a holographic optical element and the shading unit.

(7)
The optical pickup according to (6), wherein the returning rays from a signal face other than the one signal face are prevented from irradiating the photodetector by the holographic optical element.

(8)
An optical disc device including:
a rotation driving unit configured to rotate-drive an optical disc;
a light source;
an objective lens configured to focus light from the light source onto a multilayer optical disc, the multilayer optical disc including two or more signal faces, each of the signal faces having a groove formed therein;
an actuator configured to displace the objective lens in a direction substantially perpendicular to a track direction of the optical disc;
a photodetector configured to receive returning rays from the optical disc, the photodetector having a light receiving face divided into four light receiving regions by a dividing line that is substantially parallel to a track direction of the optical disc and by a dividing line that is substantially perpendicular to the track direction;
a shading unit disposed at an incident side of the photodetector and configured to block, of returning rays from a signal face other than the one signal face of the optical disc, at least a diffracted ray that is diffracted by the groove; and
a calculation unit configured to generate a tracking error signal by calculating a detection signal of the photodetector,
wherein the actuator is driven with the tracking error signal.

3. Modification

Thus far, the embodiments of the present disclosure have been described specifically. However, the present disclosure is not limited to the embodiments described above, and various modifications in accordance with the technical spirit of the present disclosure can be made. For example, the wavelength of the laser light source may be other than 405 nm. In addition, the embodiments of the present disclosure can be applied to an optical disc device that either records onto or plays back an optical disc.

Further, configuration, methods, processes, shapes, materials, numerical values and the like in the above-described embodiments may be combined insofar as they are not departing from the spirit of the present disclosure.

The present disclosure contains subject matter related to that disclosed in Japanese Priority Patent Application JP 2012-188348 filed in the Japan Patent Office on Aug. 29, 2012, the entire content of which is hereby incorporated by reference.

What is claimed is:

1. An optical pickup comprising:
a light source;
an objective lens configured to focus light from the light source onto one signal face of an optical disc, the optical disc including two or more signal faces, each of the two or more signal faces having a groove formed therein;
a photodetector configured to receive returning rays from the optical disc, the photodetector having a light receiving face divided into four light receiving regions by a dividing line that is substantially parallel to a track direction of the optical disc and by a dividing line that is substantially perpendicular to the track direction; and
a shading unit disposed at an incident side of the photodetector and configured to block, of returning rays from a signal face other than the one signal face of the optical disc, at least a diffracted ray that is diffracted by the groove, wherein the shading unit is constituted by a belt-shaped shading body that extends in a direction substantially perpendicular to the track direction.

2. The optical pickup according to claim 1, wherein the shading unit is disposed at a position at which the diffracted ray substantially concentrates.

3. The optical pickup according to claim 1, wherein the shading unit blocks the diffracted ray and a reflected ray from the signal face other than the one signal face.

4. The optical pickup according to claim 1, wherein the returning rays from the optical disc are received by the photodetector via a holographic optical element and the shading unit.

5. The optical pickup according to claim 4, wherein the returning rays from the signal face other than the one signal face are prevented from irradiating the photodetector by the holographic optical element.

6. The optical pickup according to claim 1, wherein, provided that amax is a maximum value of a radius of a 0th order ray of returning rays from the one signal face and b is a distance between a center of the 0th order ray and a spot position of a 1st order ray of the returning rays from the signal face other than the one signal face, the shading unit is disposed at a position at which a ratio KK (b/amax) is substantially constant with respect to the radius of the 0th order ray along a plane where a 0th order reflected ray from the signal face other than the one signal face is focused.

7. An optical pickup comprising:
a light source;
an objective lens configured to focus light from the light source onto one signal face of an optical disc, the optical disc including two or more signal faces, each of the two or more signal faces having a groove formed therein;
a photodetector configured to receive returning rays from the optical disc, the photodetector having a light receiving face divided into four light receiving regions by a dividing line that is substantially parallel to a track direction of the optical disc and by a dividing line that is substantially perpendicular to the track direction; and
a shading unit disposed at an incident side of the photodetector and configured to block, of returning rays from a signal face other than the one signal face of the optical disc, at least a diffracted ray that is diffracted by the groove, wherein the shading unit is disposed at a position at which the diffracted ray substantially concentrates,
wherein, provided that amax is a maximum value of a radius of a 0th order ray of returning rays from the one signal face and b is a distance between a center of the 0th order ray and a spot position of a 1st order ray of the returning rays from the signal face other than the one signal face, the shading unit is disposed at a position at which a ratio KK (b/amax) is substantially constant with respect to the radius of the 0th order ray along a plane where a 0th order reflected ray from the signal face other than the one signal face is focused.

8. An optical disc device comprising:
a rotation driving unit configured to rotate-drive an optical disc;
a light source;
an objective lens configured to focus light from the light source onto a multilayer optical disc, the multilayer optical disc including two or more signal faces, each of the signal faces having a groove formed therein;
an actuator configured to displace the objective lens in a direction substantially perpendicular to a track direction of the optical disc;
a photodetector configured to receive returning rays from the optical disc, the photodetector having a light receiving face divided into four light receiving regions by a dividing line that is substantially parallel to a track direction of the optical disc and by a dividing line that is substantially perpendicular to the track direction;
a shading unit disposed at an incident side of the photodetector and configured to block, of returning rays from a signal face other than the one signal face of the optical disc, at least a diffracted ray that is diffracted by the groove; and
a calculation unit configured to generate a tracking error signal by calculating a detection signal of the photodetector, wherein the actuator is driven with the tracking error signal.

9. An optical pickup comprising:
a light source;
an objective lens configured to focus light from the light source onto one signal face of an optical disc, the optical disc including two or more signal faces, each of the two or more signal faces having a groove formed therein;
a photodetector configured to receive returning rays from the optical disc, the photodetector having a light receiving face divided into four light receiving regions by a dividing line that is substantially parallel to a track direction of the optical disc and by a dividing line that is substantially perpendicular to the track direction; and
a shading unit disposed at an incident side of the photodetector and configured to block, of returning rays from a signal face other than the one signal face of the optical disc, at least a diffracted ray that is diffracted by the groove,
wherein the returning rays from the optical disc are received by the photodetector via a holographic optical element and the shading unit.

10. The optical pickup according to claim 9, wherein the returning rays from the signal face other than the one signal face are prevented from irradiating the photodetector by the holographic optical element.

* * * * *